US009833678B2

(12) United States Patent
Kim

(10) Patent No.: US 9,833,678 B2
(45) Date of Patent: Dec. 5, 2017

(54) TAEKWONDO POOMSAE TRAINING SYSTEM

(71) Applicant: TNC KOREA Co., Ltd., Uijeongbu-si (KR)

(72) Inventor: Tae Oh Kim, Uijeongbu-si (KR)

(73) Assignee: TNC KOREA Co, Ltd., Uijeongbu-si (KR)

( * ) Notice: Subject to any disclaimer, the term of this patent is extended or adjusted under 35 U.S.C. 154(b) by 0 days.

(21) Appl. No.: 14/993,492

(22) Filed: Jan. 12, 2016

(65) Prior Publication Data
US 2016/0303453 A1    Oct. 20, 2016

(30) Foreign Application Priority Data
Apr. 15, 2015    (KR) .......................... 10-2015-0053045

(51) Int. Cl.
*A63B 69/00*    (2006.01)
*G09B 5/02*    (2006.01)
(Continued)

(52) U.S. Cl.
CPC ........ *A63B 69/004* (2013.01); *A63B 71/0622* (2013.01); *G09B 5/02* (2013.01);
(Continued)

(58) Field of Classification Search
CPC .......................... A63B 69/004; G09B 19/0038
(Continued)

(56) References Cited

U.S. PATENT DOCUMENTS

2006/0003298 A1\*   1/2006   Greenshpan ....... A63B 24/0003
                                                            434/247
2012/0052946 A1\*   3/2012   Yun ...................... A63B 69/004
                                                            463/32
(Continued)

FOREIGN PATENT DOCUMENTS

KR    10-2005-0003317    1/2005
KR    10-2007-0032842    3/2007
(Continued)

OTHER PUBLICATIONS

English Translation of 10-2005-0003317.
(Continued)

*Primary Examiner* — Thomas Hong
(74) *Attorney, Agent, or Firm* — KORUS Patent, LLC; Seong Il Jeong

(57) ABSTRACT

An embodiment of the present invention provides a Taekwondo Poomsae training system for improving Poomsae training effects of a trainee who conducts Taekwondo Poomsae training on pattern lines on a floor using three-dimensional information and image information. The Taekwondo Poomsae training system includes: a plurality of screens provided on the front and rear side regions and both side regions, respectively; a sensor unit provided in a plural number on the upper portion and the inner portion of the screen to detect the three-dimensional information of the trainee; a photographing unit provided on the upper portion of the screen to photograph the training image information of the trainee; a main control unit in which the three-dimensional information of the trainee and pre-stored Taekwondo basic pattern line operation information are compared to create a calibration training information of the trainee.

1 Claim, 2 Drawing Sheets

(51) Int. Cl.
 *G09B 19/00* (2006.01)
 *A63B 71/06* (2006.01)
 *A63B 24/00* (2006.01)

(52) U.S. Cl.
 CPC .. *G09B 19/0038* (2013.01); *A63B 2024/0012* (2013.01); *A63B 2071/0625* (2013.01); *A63B 2071/0694* (2013.01); *A63B 2220/806* (2013.01); *A63B 2220/807* (2013.01); *A63B 2225/50* (2013.01)

(58) Field of Classification Search
 USPC .......................................................... 434/247
 See application file for complete search history.

(56) References Cited

U.S. PATENT DOCUMENTS

2012/0052947 A1* 3/2012 Yun .................... G09B 19/0038
 463/32
2013/0282155 A1* 10/2013 Li ...................... A63B 24/0062
 700/91
2014/0234814 A1* 8/2014 Krosky ................... G09B 5/02
 434/236
2016/0104298 A1* 4/2016 Nam ..................... G06T 7/2033
 434/258

FOREIGN PATENT DOCUMENTS

| KR | 10-2008-0083078 | 9/2008 |
| KR | 10-2012-0043814 | 5/2012 |
| KR | 10-2013-0016105 | 2/2013 |
| KR | 10-2014-0091630 | 7/2014 |

OTHER PUBLICATIONS

English Translation of 10-2012-0043814.
English Translation of 10-2013-0016105.
English Translation of 10-2014-0091630.
English Translation of 10-2007-0032842.
English Translation of 10-2008-0083078.

* cited by examiner

TAEKWONDO POOMSAE TRAINING SYSTEM

CROSS-REFERENCE TO RELATED APPLICATION(S)

This application claims the benefit of Korean Patent Application No. 10-2015-0053045, filed on Apr. 15, 2015, which is hereby incorporated by reference herein in its entirety.

BACKGROUND

1. Technical Field

An embodiment of the present invention relates to a Taekwondo Poomsae training system.

2. Description of the Related Art

Taekwondo is a Korean national sport and a cultural heritage that represents Korea. As of the war 2014. Taekwondo had been trained by at least 60 million members in about 207 countries. Taekwondo had also been selected as one of the CI (Corporate Identity) which represents the Korean culture in 1996.

Taekwondo which is a proud cultural heritage of Korea now seems to be regressed for several reasons. One of the reasons is the lack of development of the teaching textbooks.

Currently, Taekwondo training textbooks that have been published in Korea are grasped in 10 kinds, however, most of them are only consisted of photographs and mere explanation. Therefore, it is actually not easy to learn the skills using only textbook without an instructor.

Among martial arts-related hooks, video or DVD that are sold by Amazon.com, one of the best online bookstores in the United States, Taekwondo related content remains in the lower ranks, which neatly explains these circumstances.

Therefore, for the globalization of Taekwondo, there is an urgent need to develop teaching textbooks that user can use and easily learn Taekwondo all by himself.

In addition, since the current textbooks used to teach Takwondo were produced mainly based on Poomsae forms, they were difficult to be utilized in the actual sparring and games or the like. It was also difficult to induce an interest to the user because the textbooks gave a hard feeling.

Currently, in golf lessons, the user is allowed to feel the fun of golf through the method of teaching where the full swing is first taught to the beginners and then correct their posture. There is a need to develop a teaching textbook that the user can easily learn practical Taekwondo techniques capable of being applied to the actual games and induce interest in the same manner as the above-mentioned golf lesson method.

PRIOR ART DOCUMENT

Patent Document (Patent Document 1) Unexamined Korean Patent Publication No. 10-2007-0032842 entitled "A multi-user wane service method and system using a motion capture"

(Patent Document 2) Unexamined Korean Patent Publication No. 10-2008-0083078 entitled "Taekwondo learning system based on image analysis".

SUMMARY

An embodiment of the present invention provides a Taekwondo Poomsae training system for improving Poomsae training effects of a trainee who conducts Taekwondo Poomsae training on pattern lines using three-dimensional intimation and image information.

The Taekwondo Poomsae training system according to an embodiment of the present invention is a Taekwondo Poomsae training system for a trainee who conducts Taekwondo Poomsae training on pattern lines provided on the floor surface, and comprises: a plurality of screens provided on the front and rear side regions and both side regions, respectively; a sensor unit provided in a plural number on the upper portion and the inner portion of the screens to detect the three-dimensional information of the trainee; a photographing unit provided on the upper portion of the screens to photograph the training image information of the trainee; a main control unit for comparing the three-dimensional information of the trainee and pre-stored Taekwondo basic pattern line operation information to generate the calibration training information of the trainee, and controlling the calibration training information to output to the screens with the training image information; a voice output unit for outputting by voice the calibration training information according to the control of the main control unit; a beam projector for emitting the calibration training information and the training image information according to the control of the main control unit; and a laser projector mounted above the floor surface, the laser projector emitting a laser beam to guide a movement direction of the trainee's foot in the Poomsae direction based on the Taekwondo basic pattern line operation information.

The main control unit may comprise a communication unit for transmitting and receiving data with the sensor unit, the photographing unit, the voice output unit, the beam projector and the laser projector; a comparison determination unit for comparing the three-dimensional information of the trainee and the pre-stored Taekwondo basic pattern line operation information; an information generation unit for generating the calibration training information including the correction information in which the three-dimensional information has been corrected to meet the Taekwondo basic pattern line operation information, in the case where, as a result of comparison, it is judged that the three dimensional information differs from the taekwondo basic pattern line operation information; a display unit for displaying the calibration training information and the training image information; a storage unit for storing the Taekwondo basic pattern line operation information, the three-dimensional information and the calibration training information; and a control unit for controlling the operation of each unit constituting the main control unit.

The comparison determination unit divides a region where the trainee moves into a plurality of subregions, and compares the operation of the three-dimensional information of the trainee and the pre-stored Taekwondo basic pattern line operation information after converting them so that the three-dimensional information can match with the plurality of regions.

The Taekwondo Poomsae training system according to one embodiment of the present invention can provide a calibration training information to a trainee who conducts Taekwondo Poomsae training on pattern lines using three-dimensional information and image information.

Also, one embodiment of the present invention can provide the calibration training information to the trainee to provide the calibrated information in real time to the trainee, through which the trainee's training effects as well as the efficiency of the acquisition of techniques can be improved.

In addition, one embodiment of the present invention can provide the training information and the calibration training information to the trainee, which can exercise Poomsaeson, sparring and kick operation.

Further, in one embodiment of the present invention, the trainee can practice Taekwondo alone even without an instructor.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
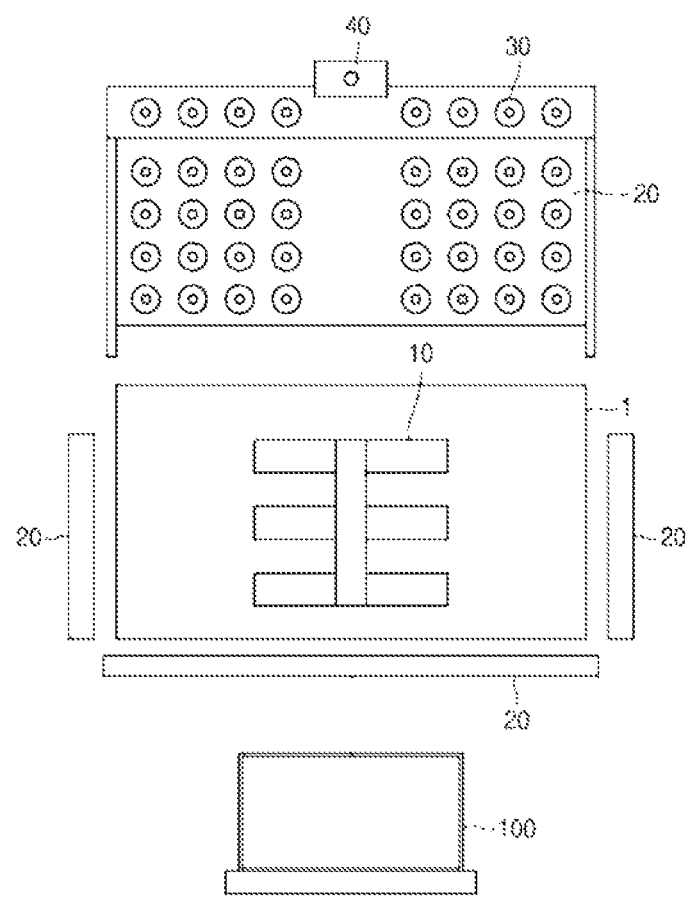
FIG. 1 is a diagram schematically showing Taekwondo Poomsae training system according to one embodiment of the present invention.

Hereinafter, the configuration and operation of preferred embodiments of the present invention will be described in detail with reference to the accompanying drawings. Here, in the case of assigning the reference numerals to the components of the figures, it should be noted that, with respect to same components, the same reference numerals are used even in different figures.

First, the terms used in the present invention are briefly described and the embodiments of the present invention will be described in detail.

As the terms used in the present invention, the generic terms currently widely used have been selected, in consideration of the functions of the present invention, but they may be varied depending on the intention of technicians working in the art, the appearance of precedents or new techniques and the like. Also, in certain cases, there may also be a term that was arbitrarily selected by the applicant. In this case, its meaning will be described in detail in the relevant description part of the invention. Therefore, the terms used in the present invention should be defined based on the contents throughout the present invention, rather than the name of simple terms.

When it is assumed that any part used throughout the specification "comprises" any element, it is not intended to exclude other components, but it may further include other components, unless otherwise indicated. The terms such as "... part or unit" described in the specification refer to a unit for processing at least one function or operation, which may be implemented by hardware or software, or a combination of hardware and software.

Below, the embodiments of the present invention will be described in detail with reference to the accompanying drawings such that it can be easily practiced by a person of ordinary skill in the art to Which this invention pertains. However, the present invention can be implemented in several different manner and it is not limited to the embodiments. Further, in order to clearly describe the present invention in the drawings, the parts not related to the description are omitted, the similar parts used throughout the specification are denoted by the similar reference numerals.

Also, the main control unit 100 which is a component of the present invention includes for example Window 2007 or more operating systems, quad-core or more CPU, 64 Mb or more memory and the like. The main control unit 100 is a known computer system, including an input unit such as a mouse or a keyboard, a storage unit for storing various operation programs or data, an output unit such as a speaker, a monitor and a printer, and a control unit for conducting Taekwondo Poomsae training-related control applied to the present invention. If it is determined that detailed description of the relevant known configuration or function may make the gist of the present invention unclear, the detailed description thereof will be omitted.

Figure 2:
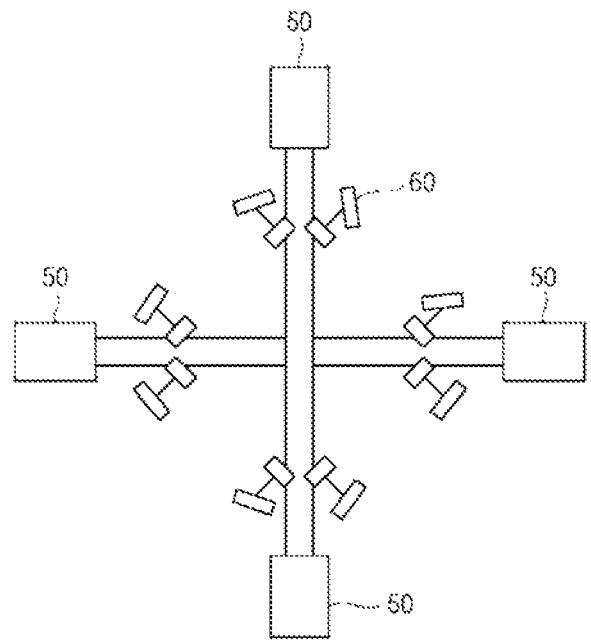
FIG. 2 is a diagram showing the photographing part and the projector provided in the Taekwondo Poomsae training system according to one embodiment of the present invention.
Figure 3:
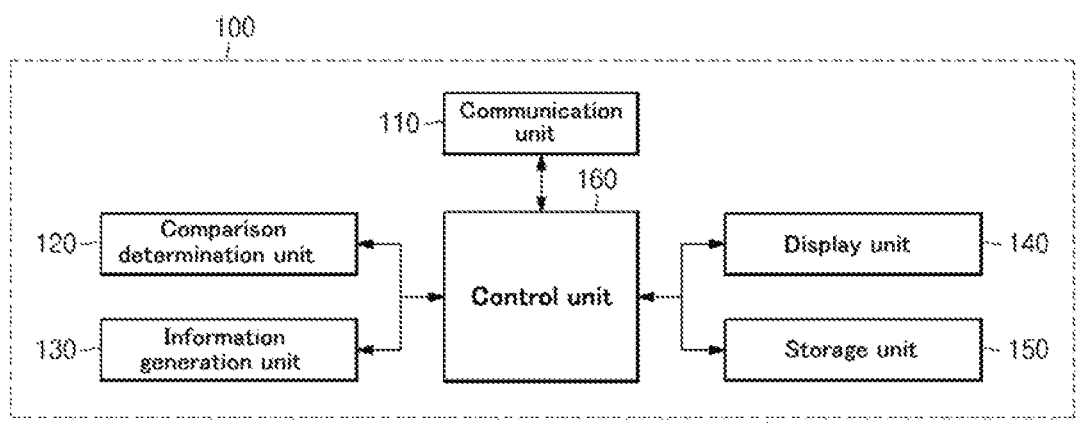
FIG. 3 is a diagram showing the main control unit provided in the Taekwondo Poomsae training system according to one embodiment of the present invention.

FIG. 1 is a diagram schematically showing Taekwondo Poomsae training system according to one embodiment of the present invention. FIG. 2 is a diagram showing the photographing part and the projector provided in the Taekwondo Poomsae training system according to one embodiment of the present invention. FIG. 3 is a diagram showing the main control unit provided in the Taekwondo Poomsae training system according to one embodiment of the present invention.

Referring to FIGS. 1 and 2, the Taekwondo Poomsae training system according to one embodiment of the present invention is the Taekwondo Poomsaeson training system for improving Poomsae training elects of a trainee who conducts Taekwondo Poomsae training on the pattern lines 10 provided on a floor surface 1, and includes a screen 20, a beam projector 50, a laser projector 60, a sensor unit 30, a photographing unit 40, a voice output unit (not shown) and a main control unit 100.

On the other hand, the Poomsaeson (meaning "pattern lines") 10 refers to Taegeuk Poomsae and is composed of eight trigrams (divination signs) which are referred to in Eastern divination lore. The pattern lines of a person with the title "dan" (meaning "expert") is composed of Chinese characters which symbolizes the name of Poomsaeson. The Poomsaeson 10 is displayed as approximately the king 王 (Wang) according to the pattern of eight ingrains. The Poomsaeson divided from Taegeuk 1-jahng to Taegeuk 8-jahng according to the sequence of the eight ingrains and is displayed as the king 王 (Wang) for convenience by connecting vertically in the horizontal center of the eight trigrams. However, the arrangement of the operation shows the difference in Umhyo ( -- ) and Yanhyo (-). At this time, the motion in Umuhyo has to shorter length of standing than the motion in Yanhyo. In other words, it is characterized in that the progress of the motion is short. More specifically, the Poomsaeson of a person with the title "dan" is displayed as letters such as Sunbeesa 士 (meaning "scholar"), Geumkang as Malmosan 山 (meaning "mountain"), Taebaek as Zieulgong 工 (meaning "build"). Pyoungwon as one ── (meaning "one"), Sipjin as ten 十 (meaning "ten"), Jite as Hangul Oh ㅗ (Oh vowel), Chonkwon as Hangul Uh ㅓ (Uh vowel), Hansu as water 水 (water), and Ylyeo as Man 卍 (Buddhist). Among them, since the Poomsaeson of Zitae and Chonkwon have the pattern "ㅗ" and "ㅓ" from the Zeulgong "工" in which Zitae means as land excluding the upper line and, reversely, Chonkwon means a heaven excluding the lower line, this is referred to as Hangul vowel "Oh (ㅗ)" and "Uh (ㅓ)". Otherwise, the character "工" is a sign that symbolizes heaven, earth and man in the Orient. That is, the upper line symbolizes a heaven (天), the lower line symbolizes a land (地) and the middle vertical line symbolizes people (人).

The screens 20 are provided at each of the front and rear side regions and both side regions of the floor surface (1), respectively. The screens 20 is a device for displaying images associated with the pattern line training emitted through the beam projector 50. For example, in the present embodiment, the screens are fixed by a floor surface or a fixing means as as to not cause shaking or sound phenomenon due to the external environment. The screens are preferably matt white materials which do not reflect light so that beam emitted by the beam projector 50 can be clearly displayed. Further, the screens 20 can receive an image associated with a target shape to be hit by the trainees from the beam projector 50 by the control of the main control unit 100 and output the image in the trainee direction.

On the other hand, in the present invention, as a device for displaying images associated with the pattern line training, a screen device is included as an example, but it is not limited thereto. The 3D image display device for emitting in the trainee direction by directly implementing the 3D stereoscopic image can be used.

The beam projector 50 is installed in a plural number at the upper position opposite to a screen 20, for example on the ceiling of the indoor training range, and it emits the calibration training information and the training image information to the screen 20 according to the control of the main control unit 100. The beam projector 50 may also emit image information associated with the target shape to be hit by the trainee in addition to the calibration training information and the training image information to the screen 20. In addition, the beam projector 50 may emit the 3D stereoscopic information towards the screen 20 when the screen (20) is configured as a 3D image display device.

The laser projector 60 is mounted above the floor surface 1, and emits a laser beam which induces the moving direction of the trainee's foot in the direction of Poomsaeson 10 under the control of the main control unit 100 based on Taekwondo basic pattern line motion information. That is, the laser projector 60, upon movement of the trainee's Poomsaeson, emits the laser beam on the Poomsaeson 10 or the floor surface 1 in order to designate the foot position of the next motion, through which the trainee may conduct the foot motion training including a kick. At this time, the laser projector 60 can be fixedly installed on the ceiling so as to move vertically and horizontally as shown in FIG. 2.

The sensor unit 30 is provided in a plural number on the upper portion and the inside region of the screen 20, and detects the three-dimensional information of the trainee. The sensor unit 30 may include a depth measurement sensor consisting of an infrared laser projector coupled with CMOS sensor or a motion detection sensor coupled with the photographing unit 40 to detect the motion information of the trainee using the training image information of the trainee.

The above-mentioned sensor unit 30 is a position sensor for collecting the three-dimensional position information of the trainee. The sensor unit 30 can shoot countless infrared beams in one camera and detect the three-dimensional information even under any brightness condition through the inflated rays to be reflected. It can detect the horizontal and vertical directions as well as a distance dose or distant to the sensor to grasp where the whole body positions and how the body acts. The method for taking a depth image by means of the infrared camera is generally a time of flight method, but a pattern (structured light) is projected on the object and thus the depth can be calculated through the stereo matching. In other embodiments, it can detect the trainee for dynamic object which occurs the distance step utilizing a Blob labeling method in the stream sequence, estimate the position of the space and impart an ID for each dynamic object.

The photographing unit 40 is provided on the upper side portion of the screens 20 and it is a camera device for shooting the training video information of the trainee. The photographing unit 40 transmits the photographed training image information to the main control unit 100 and has preferably a resolution of 1920×1080 for each camera. It is used to capture images of 10 to 20 frames per second.

Apart from the screens 20, the voice output unit is a device for outputting by voice the calibration training information under the control of the main control unit 100, wherein the main control unit 100 serves to transmit by voice the calibration training information provided to the trainee. In this case, the voice on put unit includes a variety of sound modules capable of making sound. In one embodiment, the voice output unit guides the moving gesture information for each of the calibration training information to the trainee.

The main control unit 100 compares the three-dimensional information of the trainee and the pre-stored Taekwondo basic pattern line operation information to generate a calibrated training information of the trainee, and then controls the generated calibration training information to output along with the training information to the screens 20.

The main control unit 100 includes a communication unit 110, a comparison determination unit 120, an information generation unit 130, a display unit 140, a storage unit 150 and and a control unit 160.

The communication unit 110 is a device for transmitting and receiving data with a sensor unit 30, a photographing unit 40, an voice output unit and a beam projector 50 and it transmits and receives a three-dimensional information, a training image information, a calibration training information or a control command signal and the like of the trainee. To this end, the communication unit 110 can communicate though at least one communication method selected from the group consisting of a wireless LAN (Local Area Network), MAN (Metropolitan Area Network), GSM (Global System for Mobile Network), EDGE (Enhanced Data GSM Environment), HSDPA (High Speed Downlink Packet Access), W-CDMA (Wideband Code Division Multiple Access), CDMA (Code Division Multiple Access), TDMA (Time Division Multiple Access), Bluetooth, Zigbee, Wi-Fi VoIP (Voice over Internet Protocol), Wi-MAX (World Interoperability for Microwave Access) and ultrasonic communication, and a variety of wired communication method.

The comparison determination unit 120 compares the three-dimensional information of the trainee and the pre-stored Taekwondo basic pattern line operation information. That is, the comparison determination unit 120 compares the movement information which is the three-dimensional information of the trainee received through the sensor 30 with the movement information included in the Taekwondo basic pattern line operation information pre-stored in the storage unit 150. To this end, the comparison determination unit 120 processes the movement information of the trainee using the three: dimensional information collected through the sensor unit 30 to generate a trainee behavior information.

In this case, the comparison determination unit 120 divides a region where the trainee moves into a plurality of subregions. For example, the region where the trainee moves are divided into 16 subregions consisting of four horizontal and four vertical. The horizontal is set to X-axis and the vertical to Y-axis. Each of these subregions is allocated to have a size of 10×10. In this case, the comparison determination unit 120 grasps in a real time about which of the divided 16 subregions belongs to X-axis and Y-axis coordinate of the three-dimensional information of the trainee, that is, the position information, thereby region per coordinate is allocated, and then compares with the position information contained in the basic pattern line operation information stored in the storage unit 150 on the same basis to determine whether both positions coincide with each other.

In the case where, as a result of comparison through the comparison determination unit 120, it is judged that the three dimensional information differs from the Taekwondo basic pattern line operation information, the information generation unit 130 generates a calibration training information including the corrected information in which the three dimensional information has been corrected to meet the Taekwondo basic pattern line operation information. In this case, the correction information may be voice information, text information or image information. For example, if the corrected intimation is voice information or text information, the information generation unit can implement the moving information such as left movement, right movement, forward movement, backward movement, extension of left and right hands to forward, backward, side, upward and downward from the three dimensional information of the trainee into the voice or text information and supplies to the voice output unit or screen 20. In this case, the correction information includes the foot position information showing the foot movement direction of the trainees. The information generation unit 130 transmits the calibration training information including the foot position information to the main control unit 100.

Due to the control of the main control unit 100, the laser beam which induces movement of the foot of the trainee through the laser projector 60 in addition to the voice or text information can emit on the poomsaeson 10 or the floor surface 1. Further, in the case where the corrected information is an image information, the information generation unit 130 can extract the motion information corresponding to the three dimensional information of the trainee necessary for correction among the Taekwondo basic pattern line operation information stored in the storage unit 130 and then provide to the screen 20.

The display unit 140 is a device which displays the calibration training information and the training image information to the training management body, and it may be LCD (Liquid Crystal Display), PDP (Plasma Display Panel), or a projector display, or it may be an autostemography such as shutter glass method, a lenticular method, a parallax barrier method, or a three dimensional display using hologram, or it may be a display in the form of touch-screen which can recognize a touch input. The display unit 140 may display the trainee information, training ability score or enter and receive the trainee information.

The said storage unit 150 is a device that stores the Taekwondo basic Pumusaeson information, the three-dimensional information and the calibration training information, and it can include RAM, ROM, EEPROM (Electrically Erasable and Programmable Read Only Memory), SDRAM (Synchronous Dynamic Random Access Memory) or HDD, but the present invention is not intended to limit the kind of the storage unit 150.

The control unit 160 is a device for controlling the operation of each component which constitutes the main control unit (100), and it compares the three-dimensional information of the trainee with the pre-stored Taekwondo basic pattern line operation information to generate the calibration training information of the trainee, and it can control so that the generated calibration training information is outputted together with the training information information to the screen 20.

Such control unit 160 controls the operation of each component constituting the main control unit 100 and, for Pumusaeson training around the hands of the trainee, the calibration training information and the training image information are displayed on the screen 20, and for Pumusaeson training around the foot of the trainee, a laser beam which induces the foot movement direction through the laser projector 60 is emitted on the Poomsaeson 10 or the floor surface 1.

The control unit (10) edits information associated with the Poomsaeson training on Taiji pattern lines and transmits it to the storage unit 150, and collects and manages the information received through the communication unit and the calibration training information generated by the information generation unit 130.

According to the Taekwondo Poomsaeson training system according to one embodiment of the present invention as described above, it can provides a calibration training information capable of improving pattern line training effects of a trainee who conducts Taekwondo Poomsae training on pattern lines using the three-dimensional information and the image information. Further, one embodiment of the present invention can provide the calibration training information to the trainee and provide the calibrated information in real time to the trainee, through which the training effect of the trainee as well as the efficiency of acquisition of technique can be improved.

The above-described embodiments are for the purpose of merely illustrating the Taekwondo Poomsaeson training system according to the present invention, and the invention is not limited to the above embodiments. It will be obvious to a person skilled in the art that various changes or modifications can be made to the invention without departing from the gist of the present invention as claimed in the following claims.

What is claimed is:
1. A Taekwondo Poomsae training system comprising:
a floor with a Taekwondo pattern line, the floor being configured for a trainee to conduct Taekwondo Poomsae training thereon;
a plurality of screens provided on the front and rear side regions and both side regions, respectively;
a sensor unit provided in a plural number on the upper portion and the inner portion of the screens to detect three-dimensional information of the trainee;
a photographing unit provided on the upper portion of the screens to photograph training image information of the trainee;
a main control unit for comparing the three-dimensional information of the trainee and pre-stored taekwondo basic pattern line operation information to generate correction training information of the trainee, and controlling calibration training information to output to the screens with the training image information;
a voice output unit for outputting by voice the calibration training information according to a control of the main control unit;
a beam projector for emitting the calibration training information and the training image information according to the control of the main control unit; and
a laser projector mounted above the floor, the laser projector emitting a laser beam on the floor to guide a movement direction of the trainee's foot in the Poomsae direction based on the Taekwondo basic pattern line operation information;

wherein the main control unit comprises:

a communication unit for transmitting and receiving data with the sensor unit, the photographing unit, the voice output unit, the beam projector and the laser projector;

a comparison determination unit for comparing the three-dimensional information of the trainee and the pro-stored Taekwondo basic pattern line operation information;

an information generation unit for generating the calibration training information including the corrected information in which the three-dimensional information has been corrected to meet the Taekwondo basic pattern line operation information, in the case where, as a result of comparison, it is judged that the three-dimensional information differs from the Taekwondo basic pattern line operation information;

a display unit for displaying the calibration training information and the training image information;

a storage unit for storing the Taekwondo basic pattern line operation information, the three-dimensional information and the calibration training information; and a control unit for controlling the operation of the communication unit, the comparison determination unit, the information generation unit, the display unit, and the storage unit; and wherein the comparison determination unit divides a region where the trainee moves into a plurality of subregions, converts the three-dimensional information of the trainee into first position information so that the first position information represents whether each of the plurality of subregions is occupied based on the three-dimensional information, converts the pre-stored taekwondo basic pattern line operation information into second position information so that the second position information represents whether each of the plurality of subregions is occupied based on the pre-stored taekwondo basic pattern line operation information, and compares the first position information of the three-dimensional information of the trainee with the second position information of the pre-stored basic pattern line operation information.

* * * * *